United States Patent
Huang

(10) Patent No.: US 8,998,418 B2
(45) Date of Patent: Apr. 7, 2015

(54) COLOR LIGHT MIXING METHOD, COLOR LIGHT MIXING DEVICE AND SMALL-SIZED PROJECTING SYSTEM HAVING SUCH COLOR LIGHT MIXING DEVICE

(75) Inventor: Shi-Hwa Huang, New Taipei (TW)

(73) Assignee: Min Aik Technology Co., Ltd, Taoyuan County (TW)

( * ) Notice: Subject to any disclaimer, the term of this patent is extended or adjusted under 35 U.S.C. 154(b) by 595 days.

(21) Appl. No.: 13/232,437

(22) Filed: Sep. 14, 2011

(65) Prior Publication Data
US 2012/0242959 A1 Sep. 27, 2012

(30) Foreign Application Priority Data
Mar. 25, 2011 (TW) .............................. 100110290 A

(51) Int. Cl.
| | |
|---|---|
| H04N 9/31 | (2006.01) |
| G02B 27/09 | (2006.01) |
| G02B 27/10 | (2006.01) |
| G02B 27/14 | (2006.01) |
| G03B 21/20 | (2006.01) |
| G02B 6/27 | (2006.01) |
| G02B 27/28 | (2006.01) |

(52) U.S. Cl.
CPC .............. *H04N 9/3167* (2013.01); *G02B 6/276* (2013.01); *G02B 27/0994* (2013.01); *G02B 27/1006* (2013.01); *G02B 27/14* (2013.01); *G02B 27/286* (2013.01); *G03B 21/2013* (2013.01); *G03B 21/2073* (2013.01); *G03B 21/208* (2013.01)

(58) Field of Classification Search
USPC ................. 353/20, 38, 31, 33, 34, 37, 94, 98; 345/82; 349/61, 62, 69, 70; 362/800
See application file for complete search history.

(56) References Cited

U.S. PATENT DOCUMENTS

| | | | |
|---|---|---|---|
| 3,971,065 A | 7/1976 | Bayer | |
| 6,318,863 B1 * | 11/2001 | Tiao et al. | ........................ 353/31 |
| 2005/0083573 A1 * | 4/2005 | Itoh et al. | ...................... 359/487 |
| 2005/0185140 A1 | 8/2005 | Matsubara et al. | |
| 2006/0139916 A1 | 6/2006 | You et al. | |

(Continued)

FOREIGN PATENT DOCUMENTS

| | | |
|---|---|---|
| EP | 1003064 | 5/2000 |
| EP | 1418765 | 5/2004 |

(Continued)

OTHER PUBLICATIONS

European Patent Office issued Publication of Search Report on Nov. 19, 2012.

*Primary Examiner* — Francis M Legassee, Jr.
(74) *Attorney, Agent, or Firm* — WPAT, PC; Justin King

(57) ABSTRACT

A color light mixing device, a color light mixing method and a small-sized projecting system using the color light mixing device are provided. The color light mixing device includes a tube structure, a plurality of light-emitting units, a reflective polarizer and a microlens assembly. The light-emitting units are located at an inlet end of the tube structure. The reflective polarizer is located at the other end of the tube structure. The microlens assembly is arranged between the light-emitting units and the reflective polarizer. By the color light mixing device, the light beams with a single polarization state are homogenized and outputted to a microdisplay element of the small-sized projecting system. By an optical projection lens assembly of the small-sized projecting system, an image shown on the microdisplay element is projected onto a screen.

27 Claims, 12 Drawing Sheets

(56) References Cited

U.S. PATENT DOCUMENTS

2007/0126994 A1 6/2007 Hwang
2007/0146639 A1* 6/2007 Conner ......................... 353/20
2009/0128781 A1 5/2009 Li

FOREIGN PATENT DOCUMENTS

| JP | 10247411 | 9/1998 |
| JP | 2007288169 | 11/2007 |
| WO | 2008016900 | 2/2008 |

* cited by examiner

COLOR LIGHT MIXING METHOD, COLOR LIGHT MIXING DEVICE AND SMALL-SIZED PROJECTING SYSTEM HAVING SUCH COLOR LIGHT MIXING DEVICE

FIELD OF THE INVENTION

The present invention relates to a color light mixing method and a color light mixing device, and more particularly to a color light mixing method and a color light mixing device for use in a small-sized projecting system.

BACKGROUND OF THE INVENTION

A projecting system is widely used in our daily lives to project texts/pictures or image data onto a screen in order to facilitate many persons to view the enlarged texts/pictures or image data in a visually comfortable manner. Recently, the general trends in designing electronic devices are toward small size, light weightiness and easy portability to meet the requirements of humanization. Similarly, the projecting system is developed toward miniaturization. As a consequence, the projecting system can be applied to electronic devices such as 3G mobile phones or personal digital assistants (PDAs). In addition, a small-sized projecting system becomes a portable electronic device. On account of its portability, the user may use small-sized projecting systems to watch movies everywhere they are, and thus the amusement purpose can be achieved without difficulty.

FIG. 1 is a schematic view illustrating a conventional projecting system. As shown in FIG. 1, the conventional projecting system 1 comprises a color light mixing device 11, a prism 12, a microdisplay element 13 and an optical projection lens assembly 14. For example, the microdisplay element 13 is a digital micromirror device (DMD). The light source provided by the color light mixing device 11 illuminates the microdisplay element 13 through the prism 12. Consequently, the image shown on the microdisplay element 13 is transmitted through the prism 12 and then directed to the optical projection lens assembly 14. The image is processed by the optical projection lens assembly 14 and then projected onto a screen 9 in front of the optical projection lens assembly 14, so that the image is enlarged. As known, if the light beams projected on the microdisplay element 13 are not homogenized, the brightness level or color at the border or the middle region of the image may be non-homogeneously distributed. That is, the quality of the light beams outputted from the color light mixing device 11 is one of the most important factors that influence the imaging performance of the projecting system 1.

FIG. 2 is a schematic view illustrating a color light mixing device according to the prior art. As shown in FIG. 2, the color light mixing device 11 comprises a red light-emitting unit 111, a green light-emitting unit 112, a blue light-emitting unit 113, a light combination unit 114 and a tube structure 115. By the light combination unit 114, the red light beams outputted from the red light-emitting unit 111, the green light beams outputted from the green light-emitting unit 112 and the blue light beams outputted from the blue light-emitting unit 113 are combined together. The combined light beams are directed into the tube structure 115. The combined light beams are reflected or scattered within the tube structure 115 for several times, and thus mixed light beams with more homogeneous brightness level or color are outputted from the tube structure 115.

The conventional projecting system 1, however, still has some drawbacks. For example, since the light beams outputted from various light-emitting units need to be combined together by the light combination unit 114 of the color light mixing device 11, the configuration of the color light mixing device 11 is complicated. Consequently, the overall volume of the conventional projecting system 1 fails to be effectively reduced.

Generally, the homogenizing degree of the brightness level or color of the light beams is positively directed to the length of the tube structure 115. That is, as the length of the tube structure 115 is increased, the brightness level or color of the light beams is distributed more homogeneously. However, if the tube structure 115 is too long, the loss of the light energy is increased and the overall volume of the projecting system 1 fails to be effectively reduced. On the other hand, although the overall volume of the tube structure 115 can be reduced by shortening the length of the tube structure 115, the homogenizing efficacy of the mixed light beams becomes unsatisfied. In other words, the use of only the tube structure 115 is insufficient to homogenize the brightness level or the color of the light beams.

Therefore, there is a need of providing an improved color light mixing device to obviate the drawbacks encountered from the prior art.

SUMMARY OF THE INVENTION

The present invention relates to a color light mixing method and a color light mixing device, and more particularly to a color light mixing method and a color light mixing device for producing a light source with homogenized brightness level and color.

The present invention also provides a color light mixing method and a color light mixing device for use in a small-sized projecting system in order to simplify the configurations of the small-sized projecting system and reduce the overall volume of the small-sized projecting system.

In accordance with an aspect of the present invention, there is provided a color light mixing device for providing a light source to illuminate a microdisplay element. The color light mixing device includes a tube structure, a plurality of light-emitting units, a reflective polarizer and a microlens assembly. The light-emitting units are used for outputting light beams, wherein the light beams outputted from light-emitting units are reflected or scattered within the tube structure for several times, so that the light beams are mixed with each other. The reflective polarizer is located at an outlet end of the tube structure, wherein P-polarized beams of the mixed light beams are permitted to be transmitted through the reflective polarizer, and S-polarized beams of the mixed light beams are reflected back to the tube structure by the reflective polarizer and reflected or scattered within the tube structure for several times again. The microlens assembly is arranged between the tube structure and the reflective polarizer for increasing randomness of the mixed light beams.

In an embodiment, the color light mixing device is included in a small-sized projecting system.

In an embodiment, the light-emitting units are located at an inlet end of the tube structure, and the tube structure is a sealed structure.

In an embodiment, the area of the inlet end of the tube structure is smaller than or equal to the area of the outlet end. The inlet end and the outlet end of the tube structure are both rectangle-shaped. Alternatively, the inlet end and the outlet end of the tube structure are both circle-shaped. Alternatively, one of the inlet end and the outlet end of the tube structure is rectangle-shaped and the other is circle-shaped.

In an embodiment, the color light mixing device further includes a quarter-wave plate, which is arranged between the tube structure and the microlens assembly, wherein portions of the S-polarized beams reflected by the reflective polarizer are converted into P-polarized beams by the quarter-wave plate.

In an embodiment, an inner wall of the tube structure is made of high reflectivity material. The high reflectivity material is micro cellular polyethylene terephthalate (MCPET), film coating mirror material or high light-scattering white material. In addition, the reflective polarizer is a nanoscale line array film.

In an embodiment, the microlens assembly includes a plurality of microlenses, which are arranged in an array. Each of the microlenses is a plano-convex lens, a biconvex lens, a concave-convex lens, a plano-concave lens, a biconcave lens or a convex-concave lens.

In an embodiment, the microlenses includes a one-dimensional array of at least two vertically-arranged cylindrical lenses and a one-dimensional array of at least two horizontally-arranged cylindrical lenses.

In an embodiment, if the light-emitting units are arranged in a one-dimensional array, a direction of arranging the microlenses is the same as a direction of arranging the light-emitting units, and the microlenses are cylindrical. Whereas, if the light-emitting units are irregularly arranged, the microlenses are arranged in a two-dimensional array, and the microlenses are rectangle-shaped or ball-shaped.

In an embodiment, the light beams outputted from at least two of the light-emitting units have different colors, or the light beams outputted from at least two of the light-emitting units have the same colors but different brightness levels.

In an embodiment, the light-emitting units are LED chips, and the light-emitting units include six LED chips in an arrangement of a 2×3 array. The six LED chips include two red LED chips respectively arranged at opposite sides of the 2×3 array for outputting red light beams, three green LED chips for outputting green light beams and one blue LED chip arranged at a middle region of the 2×3 array for outputting blue light beams, and any two adjacent ones of the LED chips output light beams of different colors. Alternatively, the six LED chips include two blue LED chips respectively arranged at opposite sides of the 2×3 array for outputting blue light beams, three green LED chips for outputting green light beams and one red LED chip arranged at a middle region of the 2×3 array for outputting red light beams, and any two adjacent ones of the LED chips output light beams of different colors.

In an embodiment, the red LED chips for outputting the red light beams are connected with each other in series or in parallel, and the green LED chips for outputting green light beams are connected with each other in series or in parallel.

In an embodiment, the light-emitting units are LED chips, and the light-emitting units include six LED chips in an arrangement of a 2×4 array. The eight LED chips include two red LED chips respectively arranged at opposite sides of the 2×4 array for outputting red light beams, four green LED chips for outputting green light beams and two blue LED chips respectively arranged at middle two columns of the 2×4 array for outputting blue light beams, and any two adjacent ones of the LED chips output light beams of different colors. Alternatively, the eight LED chips include two blue LED chips respectively arranged at opposite sides of the 2×4 array for outputting blue light beams, four green LED chips for outputting green light beams and two red LED chips respectively arranged at middle two columns of the 2×4 array for outputting red light beams, and any two adjacent ones of the LED chips output light beams of different colors.

In an embodiment, the light-emitting units are LED chips, and the light-emitting units include eight LED chips in an arrangement of a 2×4 array, wherein the 2×4 array includes two identical 2×2 arrays, wherein each of the two 2×2 arrays includes one red LED chip for outputting red light beams, one blue LED chip for outputting blue light beams and two green LED chips for outputting green light beams, and any two adjacent ones of the LED chips output light beams of different colors.

In an embodiment, the light-emitting units are LED chips, and the light-emitting units include nine LED chips in an arrangement of a 3×3 array. The nine LED chips include three blue LED chips for outputting blue light beams, three green LED chips for outputting green light beams and three red LED chips for outputting red light beams. The blue LED chips for outputting blue light beams are respectively arranged at the first row and the first column, the second row and the second column, and the third row and the third column of the 3×3 array. The green LED chips for outputting green light beams are respectively arranged at the first row and the third column, the second row and the first column, and the third row and the second column of the 3×3 array. The red LED chips for outputting red light beams are respectively arranged at the first row and the second column, the second row and the third column, and the third row and the first column of the 3×3 array.

In an embodiment, the light-emitting units are LED chips, and the light-emitting units include twelve LED chips in an arrangement of a 3×4 array. The twelve LED chips include four blue LED chips for outputting blue light beams, four green LED chips for outputting green light beams and four red LED chips for outputting red light beams. The blue LED chips for outputting blue light beams are respectively arranged at the first row and the first column, the first row and the fourth column, the second row and the second column, and the third row and the third column of the 3×4 array. The green LED chips for outputting green light beams are respectively arranged at the first row and the third column, the second row and the first column, the second row and the fourth column, and the third row and the second column of the 3×4 array. The red LED chips for outputting red light beams are respectively arranged at the first row and the second column, the second row and the third column, the third row and the first column, and the third row and the fourth column of the 3×4 array.

In an embodiment, the light-emitting units are LED chips, and the light-emitting units include fifteen LED chips in an arrangement of a 3×5 array. The fifteen LED chips include five blue LED chips for outputting blue light beams, five green LED chips for outputting green light beams and five red LED chips for outputting red light beams, wherein the blue LED chips for outputting blue light beams are respectively arranged at the first row and the first column, the first row and the fourth column, the second row and the second column, the second row and the fifth column, and the third row and the third column of the 3×5 array, the green LED chips for outputting green light beams are respectively arranged at the first row and the third column, the second row and the first column, the second row and the fourth column, the third row and the second column, and the third row and the fifth column of the 3×5 array, and the red LED chips for outputting red light beams are respectively arranged at the first row and the second column, the first row and the fifth column, the second row and the third column, the third row and the first column, and the third row and the fourth column of the 3×5 array.

In an embodiment, the light beams are outputted from the light-emitting units according to different time sequences.

In an embodiment, the microdisplay element is a LCOS (liquid crystal on silicon) panel, a digital micromirror device (DMD) or a transmissive LCD panel.

In accordance with another aspect of the present invention, there is provided a small-sized projecting system. The small-sized projecting system includes a microdisplay element, a color light mixing device and an optical projection lens assembly. The microdisplay element is used for showing an image. The color light mixing device is used for providing a light source to the microdisplay element. The color light mixing device includes a tube structure, a plurality of light-emitting units, a reflective polarizer and a microlens assembly. The light-emitting units are used for outputting light beams. The light beams outputted from light-emitting units are reflected or scattered within the tube structure for several times, so that the light beams are mixed with each other. The reflective polarizer is arranged at an outlet end of the tube structure, wherein P-polarized beams of the mixed light beams are permitted to be transmitted through the reflective polarizer, and S-polarized beams of the mixed light beams are reflected back to the tube structure by the reflective polarizer and reflected or scattered within the tube structure for several times again. The microlens assembly is arranged between the tube structure and the reflective polarizer for increasing randomness of the mixed light beams. The optical projection lens assembly is arranged between a screen and the microdisplay element for projecting the image onto the screen, so that the image is enlarged and shown on the screen.

In accordance with a further aspect of the present invention, there is provided a color light mixing method for use in a color light mixing device of a small-sized projecting system to homogenize light beams outputted from a plurality of light-emitting units. The color light mixing method includes the following steps. Firstly, a sealed space is provided, wherein the light beams are reflected or scattered within the sealed space for several times, so that the light beams are mixed with each other. A light randomness enhanced structure is provided for increasing randomness of the mixed light beams. A reflective polarizing structure is provided, wherein P-polarized beams of the randomness-increased light beams are permitted to be transmitted through the reflective polarizing structure, and S-polarized beams of the randomness-increased light beams are reflected back to the sealed space by the reflective polarizing structure and reflected or scattered within the sealed space for several times again.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a color light mixing method and a color light mixing device for use in a small-sized projecting system. The present invention will now be described more specifically with reference to the following four embodiments of the small-sized projecting system. It is noted that the following descriptions of the embodiments of this invention are presented herein for purpose of illustration and description only. Moreover, the color light mixing method and the color light mixing device will be illustrated in more details later.

Figure 1:
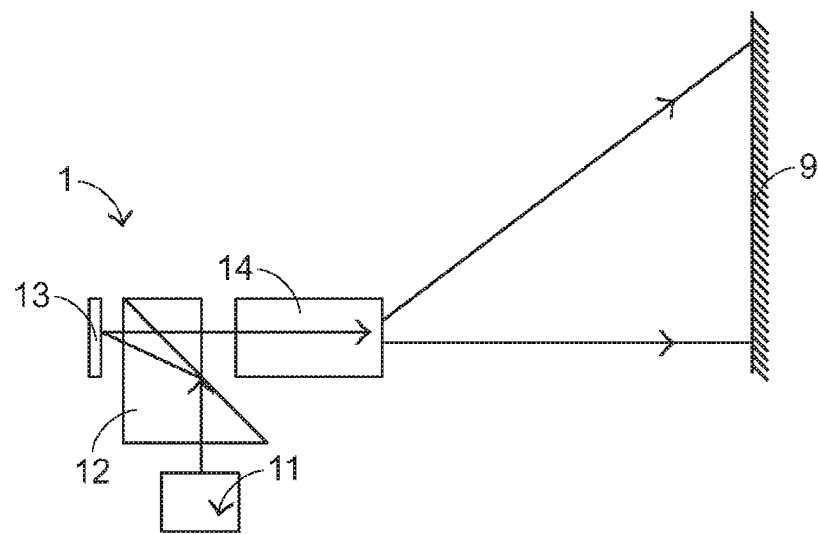
FIG. 1 is a schematic view illustrating a conventional projecting system.
Figure 2:
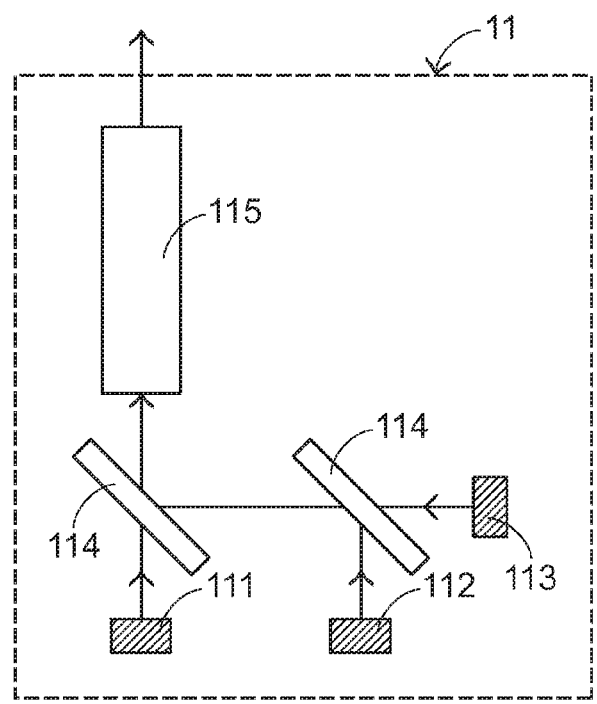
FIG. 2 is a schematic view illustrating a color light mixing device according to the prior art.
Figure 3A:
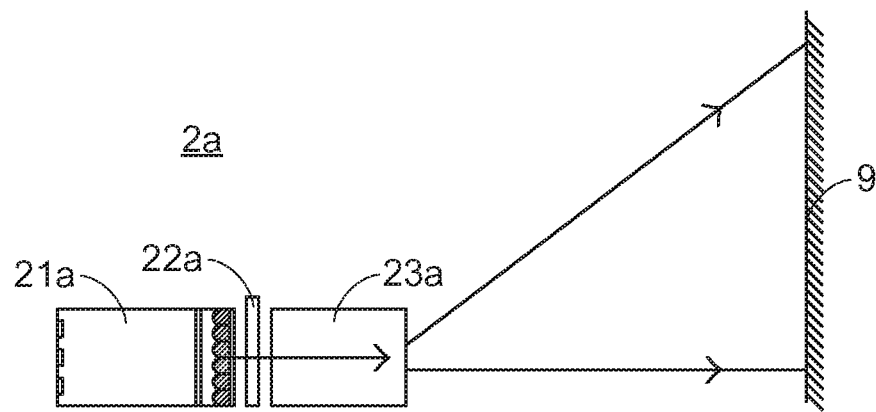
FIG. 3A is a schematic view illustrating a small-sized projecting system according to a first embodiment of the present invention.

FIG. 3A is a schematic view illustrating a small-sized projecting system according to a first embodiment of the present invention. As shown in FIG. 3A, the small-sized projecting system 2a comprises a color light mixing device 21a, a microdisplay element 22a and an optical projection lens assembly 23a. The microdisplay element 22a is arranged between the color light mixing device 21a and the optical projection lens assembly 23a. The light source provided by the color light mixing device 21a illuminates the microdisplay element 22a. By the optical projection lens assembly 23a, the image shown on the microdisplay element 22a is enlarged and projected onto a screen 9. In this embodiment, the microdisplay element 22a is a transmissive LCD panel.

Figure 3B:
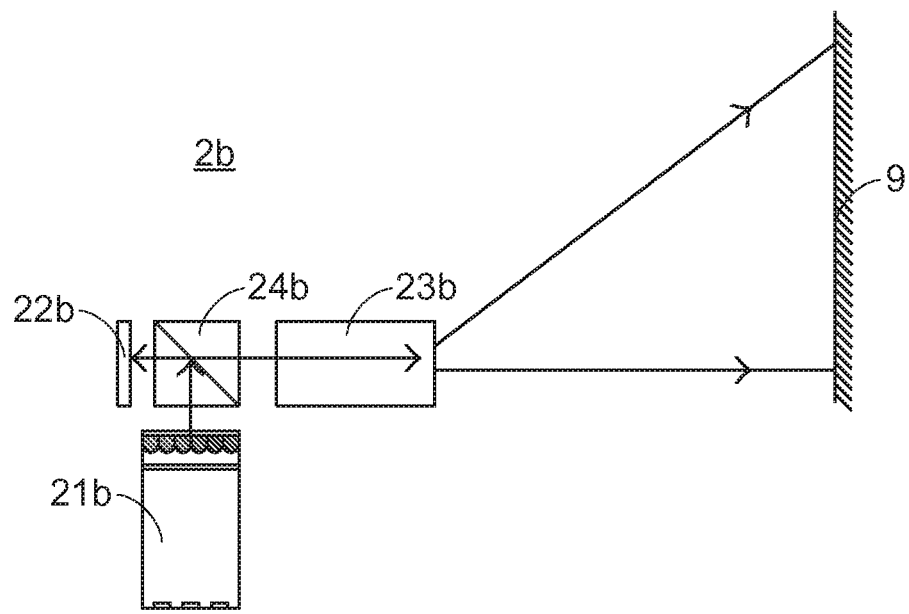
FIG. 3B is a schematic view illustrating a small-sized projecting system according to a second embodiment of the present invention.

FIG. 3B is a schematic view illustrating a small-sized projecting system according to a second embodiment of the present invention. As shown in FIG. 3B, the small-sized projecting system 2b comprises a color light mixing device 21b, a polarization beam splitter (PBS) 24b, a microdisplay element 22b and an optical projection lens assembly 23b. The polarization beam splitter 24b is arranged between the microdisplay element 22b, the color light mixing device 21b and the optical projection lens assembly 23b. The light source provided by the color light mixing device 21b illuminates the microdisplay element 22b through the polarization beam splitter 24b. Then, the image shown on the microdisplay element 22b is transmitted through the polarization beam splitter 24b and then directed to the optical projection lens assembly 23b. The image is processed by the optical projection lens assembly 23b and then projected onto a screen 9 in front of the optical projection lens assembly 23b, so that the image is enlarged. In this embodiment, the microdisplay element 22b is a LCOS (liquid crystal on silicon) panel.

Figure 3C:
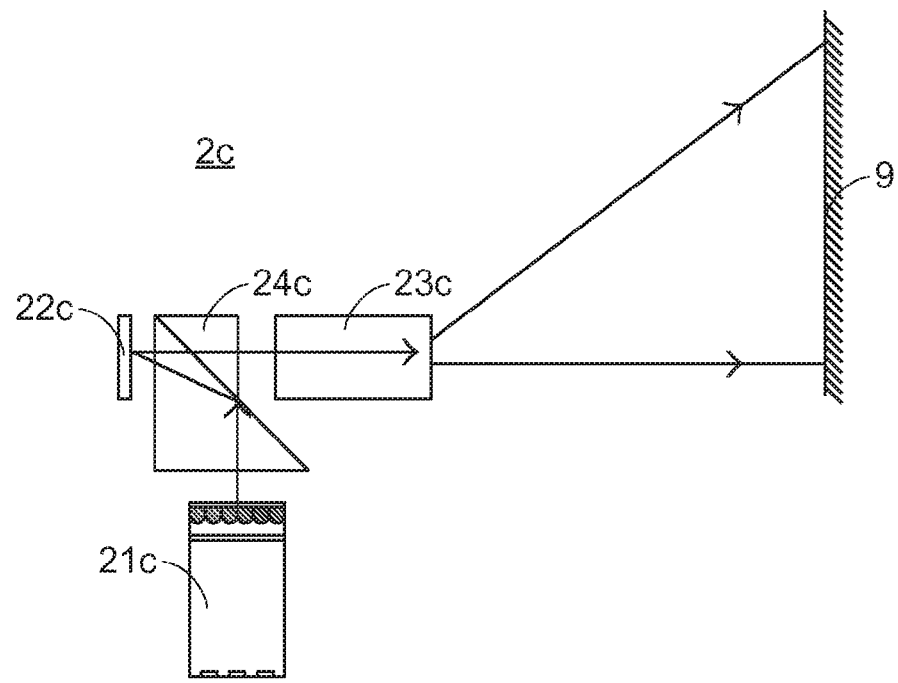
FIG. 3C is a schematic view illustrating a small-sized projecting system according to a third embodiment of the present invention.

FIG. 3C is a schematic view illustrating a small-sized projecting system according to a third embodiment of the present invention. As shown in FIG. 3C, the small-sized projecting system 2c comprises a color light mixing device 21c, a total internal reflection (TIR) prism 24c, a microdisplay element 22c and an optical projection lens assembly 23c. The total internal reflection prism 24c is arranged between the microdisplay element 22c, the color light mixing device 21c and the optical projection lens assembly 23c. The light source provided by the color light mixing device 21c illuminates the microdisplay element 22c through the total internal reflection prism 24c. Then, the image shown on the microdisplay element 22c is transmitted through the total internal reflection prism 24c and then directed to the optical projection lens assembly 23c. The image is processed by the optical projection lens assembly 23c and then projected onto a screen 9 in front of the optical projection lens assembly 23c, so that the image is enlarged. In this embodiment, the microdisplay element 22c is a digital micromirror device (DMD).

Figure 3D:
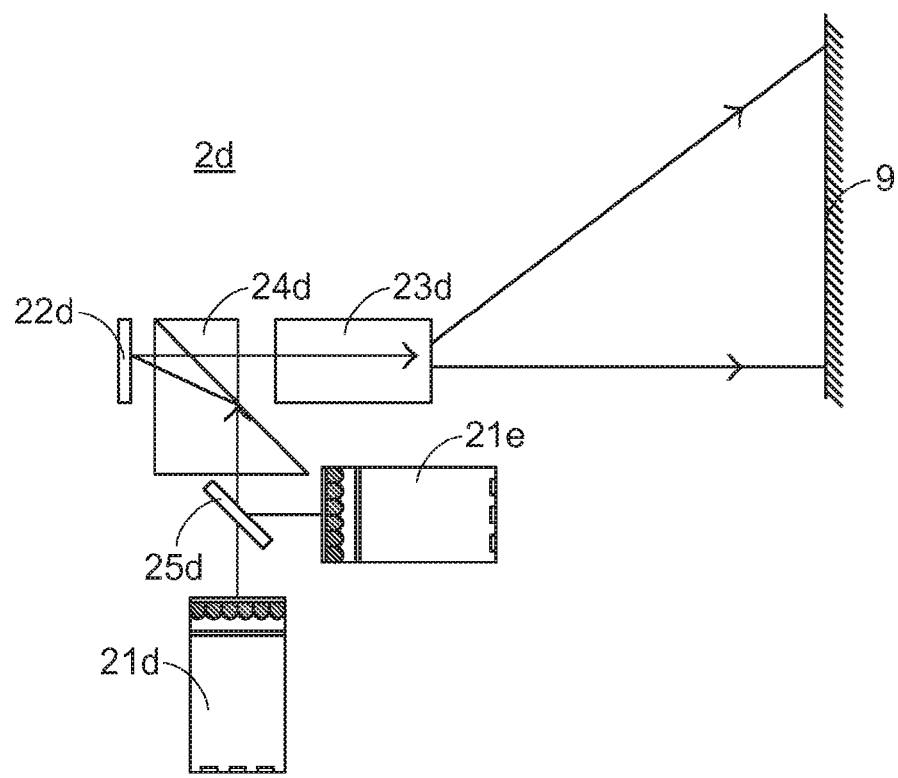
FIG. 3D is a schematic view illustrating a small-sized projecting system according to a fourth embodiment of the present invention.
Figure 4:
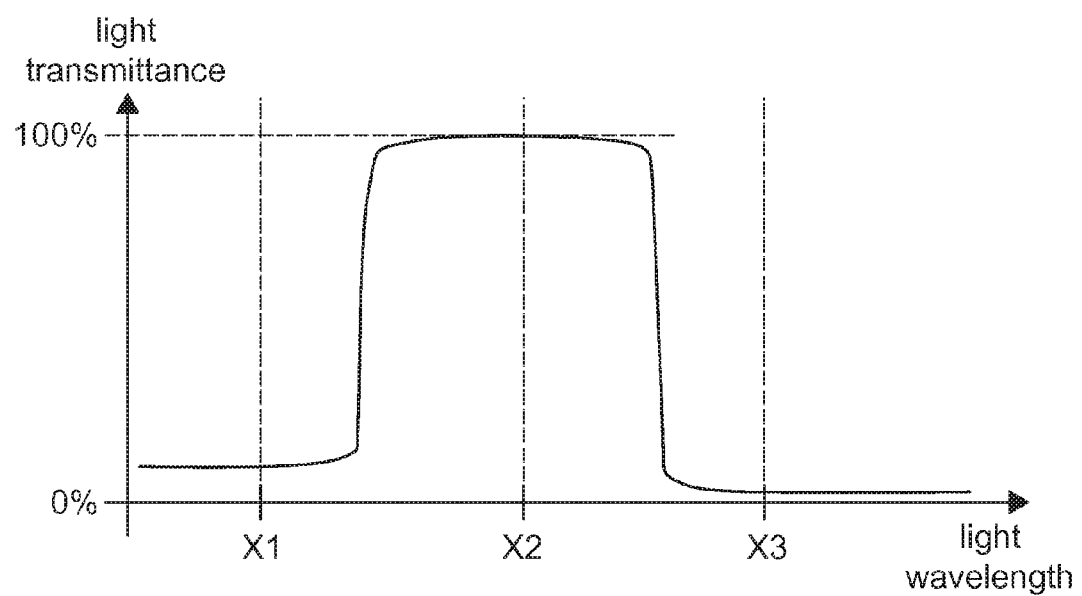
FIG. 4 is a spectrum schematic view of the light combination unit as shown in FIG. 3D.

In the above three embodiments, the small-sized projecting system utilizes a single color light mixing device to provide the light source to the microdisplay element. Of course, the small-sized projecting system of the present invention may comprise a plurality of color light mixing device to provide various light sources. FIG. 3D is a schematic view illustrating a small-sized projecting system according to a fourth embodiment of the present invention. As shown in FIG. 3D, the small-sized projecting system 2d comprises a first color light mixing device 21d, a second color light mixing device 21e, a light combination unit 25d, a total internal reflection (TIR) prism 24d, a microdisplay element 22d and an optical projection lens assembly 23d. In the first color light mixing device 21d, green LED chips is used as the light source. In the second color light mixing device 21e, red LED chips and blue LED chips are bond on the substrate together used as the light source. The spectrum schematic view of the light combination unit 25d is shown in FIG. 4. In which, the horizontal axis and the vertical axis denote the light wavelength and the light transmittance respectively. The average light wavelength of the light beams outputted from the blue LED chips, the green LED chips, and the red LED chips are respectively shown as X1, X2, and X3, so that the light beams outputted from the first color light mixing device 21d can pass through the light combination unit 25d directly, and the light beams outputted from the second color light mixing device 21e can be reflected on the light combination unit 25d.

By the light combination unit 25d, the light beams outputted from the first color light mixing device 21d and the second color light mixing device 21e are combined together. The combined light beams are irradiated on the microdisplay element 22d through the total internal reflection prism 24d. The image shown on the microdisplay element 22d is transmitted through the total internal reflection prism 24d and then directed to the optical projection lens assembly 23d. The image is processed by the optical projection lens assembly 23d and then projected onto a screen 9 in front of the optical projection lens assembly 23d, so that the image is enlarged. In this embodiment, the microdisplay element 22d is a digital micromirror device (DMD).

Figure 5:
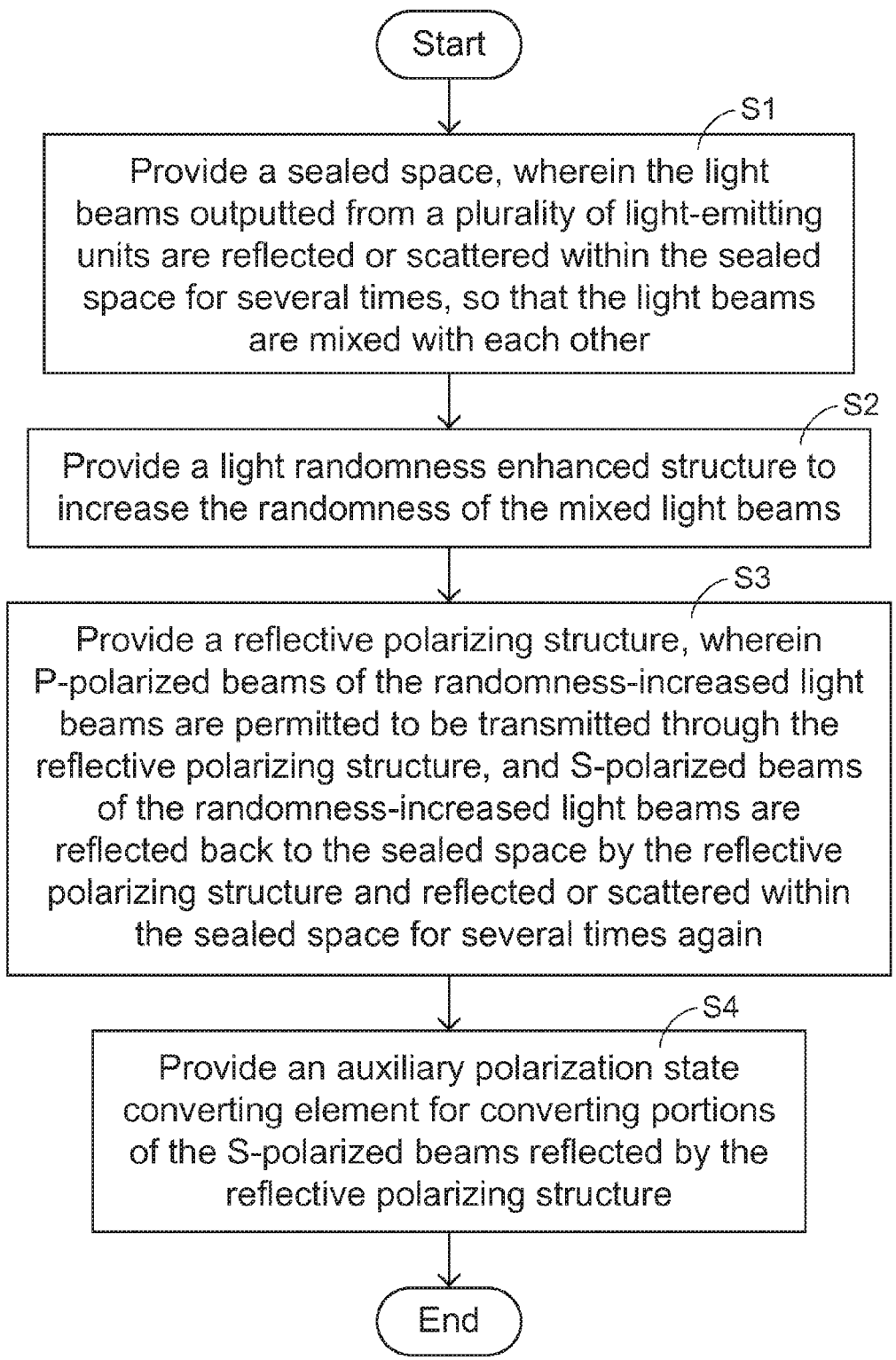
FIG. 5 schematically illustrates a flowchart of color light mixing method according to an embodiment of the present invention.

For achieving good imaging quality, the present invention provides a color light mixing method and a color light mixing device applied to a small-sized projecting system in order to homogeneously mix the light beams from a plurality of light-emitting units. As a consequence, the microdisplay element of the small-sized projecting system can be irradiated by the light beams with homogenized brightness level and color. Hereinafter, a color light mixing method according to an embodiment of the present invention will be illustrated with reference to the flowchart of FIG. 5.

In the step S1, a sealed space is provided, and the light beams outputted from a plurality of light-emitting units are reflected or scattered within the sealed space for several times, so that the light beams are mixed with each other.

In the step S2, a light randomness enhanced structure is provided to increase the randomness of the mixed light beams.

In the step S3, a reflective polarizing structure is provided, wherein P-polarized beams of the randomness-increased light beams are permitted to be transmitted through the reflective polarizing structure, and S-polarized beams of the randomness-increased light beams are reflected back to the sealed space by the reflective polarizing structure and reflected or scattered within the sealed space for several times again.

Afterwards, in the step S4, an auxiliary polarization state converting element is provided for converting portions of the S-polarized beams reflected by the reflective polarizing structure.

In an embodiment, the light randomness enhanced structure is a microlens assembly, the reflective polarizing structure is a reflective polarizer, and the auxiliary polarization state converting element is a quarter-wave plate.

It is noted that the step S4 of the color light mixing method may be selectively done or omitted according to the practical requirements.

Figure 6:
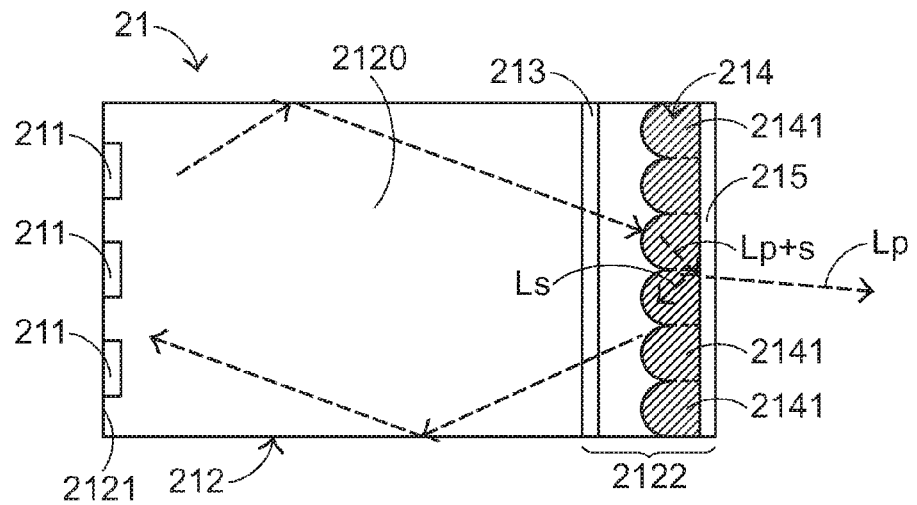
FIG. 6 is a schematic view illustrating a color light mixing device according to an embodiment of the present invention.

Hereinafter, a color light mixing device using the above color light mixing method will be illustrated with reference to FIG. 6. FIG. 6 is a schematic view illustrating a color light mixing device according to an embodiment of the present invention. As shown in FIG. 6, the color light mixing device 21 comprises a plurality of light-emitting units 211, a tube structure 212, a quarter-wave plate 213, a microlens assembly 214 and a reflective polarizer 215. The light-emitting units 211 are located at an inlet end 2121 of the tube structure 212. From inside to outside, the quarter-wave plate 213, the microlens assembly 214 and the reflective polarizer 215 are sequentially arranged at the outlet end 2122 of the tube structure 212. In such way, the tube structure 212 is sealed. It is noted that the quarter-wave plate 213 is used as an auxiliary polarization state converting element. According to the practical requirements, the quarter-wave plate 213 may be selectively used or omitted.

The light-emitting units 211 are used for outputting light beams. The color and brightness level of the light beams outputted from any two of the light-emitting units 211 may be identical or different. Moreover, the sealed space 2120 mentioned in the step S1 of the color light mixing method is formed in the tube structure 212. Moreover, the light beams outputted from the light-emitting units 211 are directed to the inner wall of the tube structure 212 and reflected or scattered within the sealed space 2120 to result in mixed light beams. It is preferred that the inner wall of the tube structure 212 is made of high reflectivity material. An example of the high reflectivity material includes but is not limited to micro cellular polyethylene terephthalate (MCPET), film coating mirror material or high light-scattering white material.

Moreover, the microlens assembly 214 comprises a plurality of microlenses 2141. After the mixed light beams are transmitted through the microlenses 2141, the randomness is increased. For example, in a case that one group of light beams pass through a single lens, one group of light beams are outputted. Whereas, in a case that one group of light beams pass through two lenses, two groups of light beams are outputted because they are accumulated. The rest may be deduced by analogy. In such way, the randomness is increased.

Figure 7A:
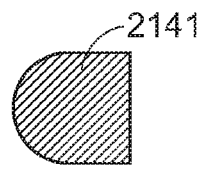
FIG. 7A schematically illustrates the use of a plano-convex lens as the microlens.
Figure 7D:
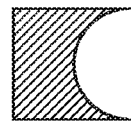
FIG. 7D schematically illustrates the use of a plano-concave lens as the microlens.
Figure 7B:
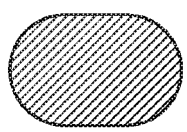
FIG. 7B schematically illustrates the use of a biconvex lens as the microlens.
Figure 7E:
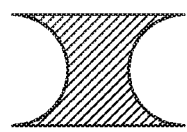
FIG. 7E schematically illustrates the use of a biconcave lens as the microlens.
Figure 7C:
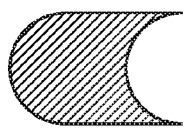
FIG. 7C schematically illustrates the use of a concave-convex lens as the microlens.
Figure 7F:
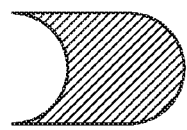
FIG. 7F schematically illustrates the use of a convex-concave as the microlens.

FIGS. 7A-7F schematically illustrate some exemplary microlenses 2141 of the microlens assembly 214. As shown in FIG. 7A, the microlens 2141 is a plano-convex lens. As shown in FIG. 7B, the microlens 2141 is a biconvex lens. As shown in FIG. 7C, the microlens 2141 is a concave-convex lens. As shown in FIG. 7D, the microlens 2141 is a plano-concave lens. As shown in FIG. 7E, the microlens 2141 is a biconcave lens. As shown in FIG. 7F, the microlens 2141 is a convex-concave lens.

Figure 8A:
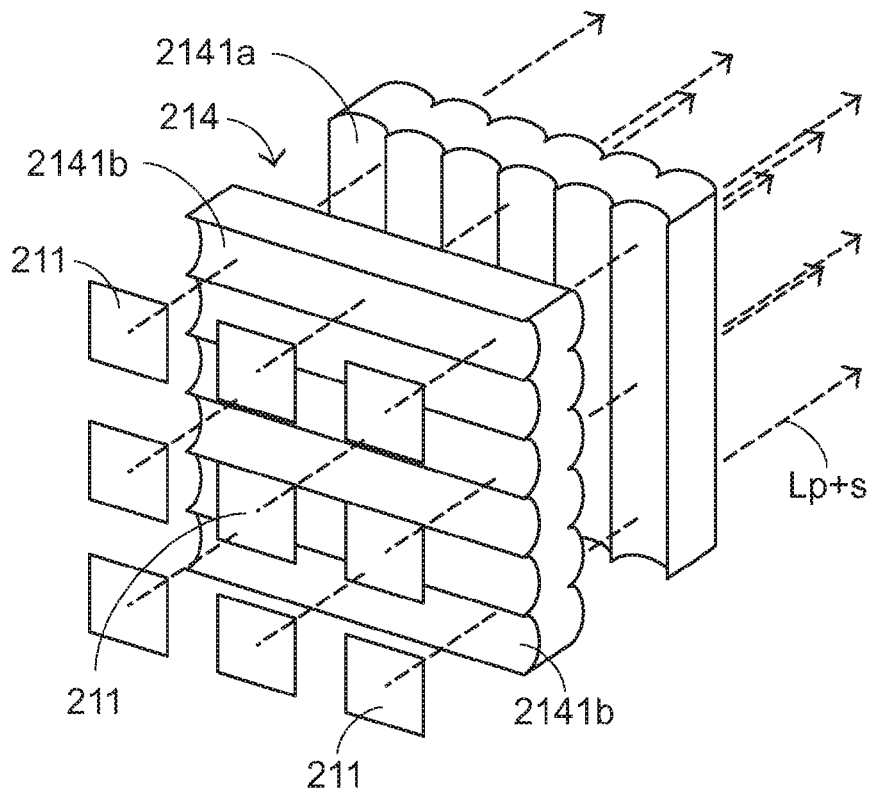
FIG. 8A is a schematic view illustrating a first exemplary arrangement of the microlenses.
Figure 8B:
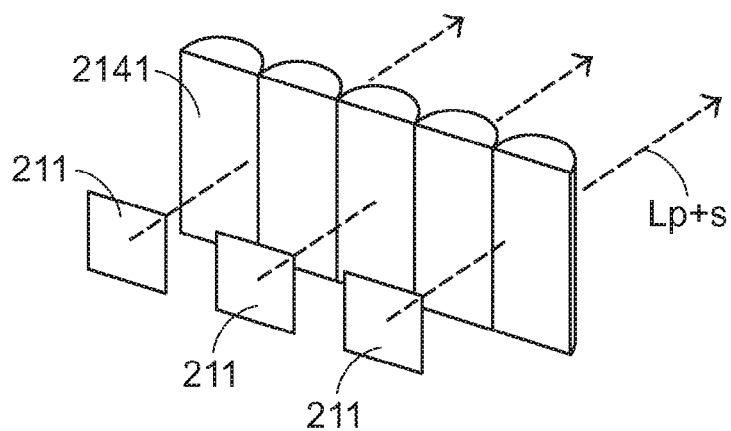
FIG. 8B is a schematic view illustrating a second exemplary arrangement of the microlenses.

Hereinafter, some exemplary arrangements of the microlenses 2141 will be illustrated with reference to FIGS. 8A-8D. FIG. 8A is a schematic view illustrating a first exemplary arrangement of the microlenses. As shown in FIG. 8A, these microlenses 2141 are divided into a one-dimensional array of vertically-arranged cylindrical lenses 2141a and a one-dimensional array of horizontally-arranged cylindrical lenses 2141b. FIG. 8B is a schematic view illustrating a second exemplary arrangement of the microlenses. As shown in FIG. 8B, these microlenses 2141 are arranged as a one-dimensional array of vertically-arranged cylindrical lenses, wherein the direction of arranging these microlenses 2141 is the same as the direction of arranging the light-emitting units 211.

Figure 8C:
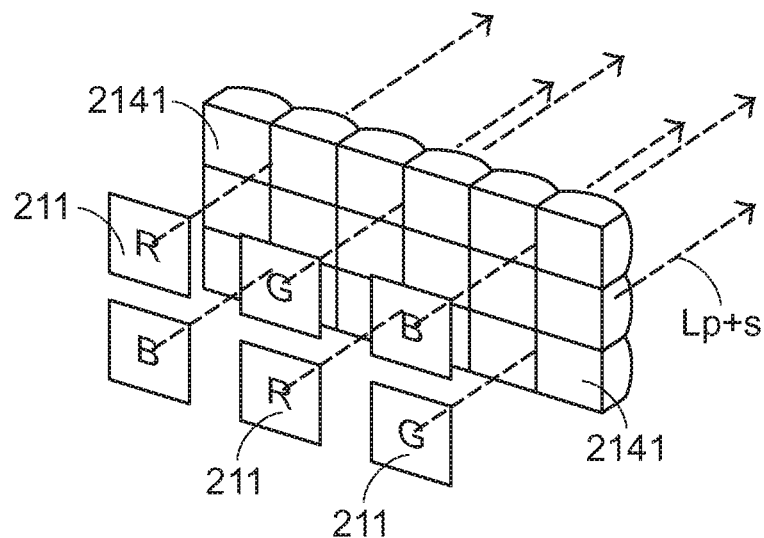
FIG. 8C is a schematic view illustrating a third exemplary arrangement of the microlenses.
Figure 8D:
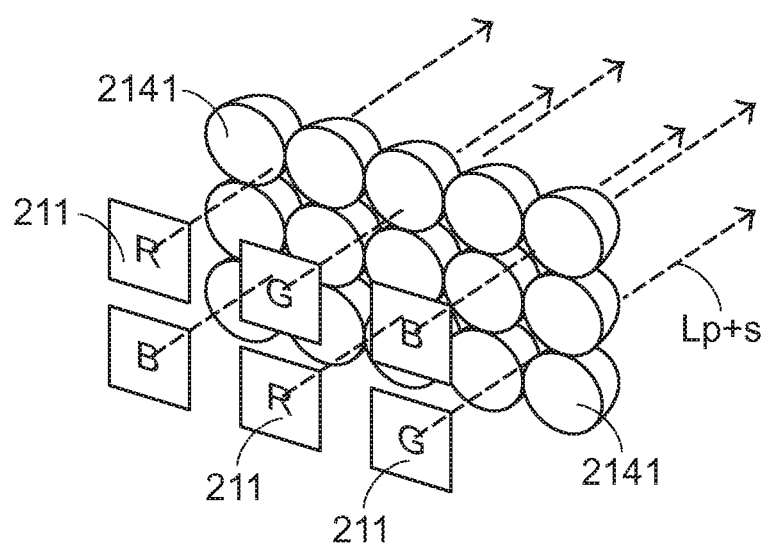
FIG. 8D is a schematic view illustrating a fourth exemplary arrangement of the microlenses.

Whereas, if the light-emitting units 211 for outputting different light colors are irregularly arranged, it is preferred that these microlenses 2141 are arranged in a two-dimensional array. FIG. 8C is a schematic view illustrating a third exemplary arrangement of the microlenses. As shown in FIG. 8C, these microlenses 2141 are arranged in a two-dimensional array. In addition, the microlenses 2141 are rectangle-shaped. FIG. 8D is a schematic view illustrating a fourth exemplary arrangement of the microlenses. As shown in FIG. 8D, these microlenses 2141 are also arranged in a two-dimensional array. In addition, the microlenses 2141 are ball-shaped.

Please refer to FIG. 6 again. After the mixed light beams are transmitted through the microlens assembly 214, the randomness-increased light beams $L_{p+s}$ are directed to the reflective polarizer 215. The P-polarized beams $L_p$ of the randomness-increased light beams $L_{p+s}$ are permitted to be transmitted through the reflective polarizer 215, but the S-polarized beams $L_s$ of the randomness-increased light beams $L_{p+s}$ are reflected back. After the S-polarized beams $L_s$ of the reflected light beams are transmitted through the microlens assembly 214 and the quarter-wave plate 213, the S-polarized beams $L_s$ are returned back to the sealed space of the tube structure 212 and reflected or scattered within the sealed space for several times again. In such way, the S-polarized beams $L_s$ are mixed with each other and converted into P-polarized beams, so that the light beams can be effectively recycled. In other words, the use of the quarter-wave plate 213 can achieve the efficacy of converting a portion of said S-polarized beams reflected by the reflective polarizer 215 into P-polarized beams. Moreover, in this embodiment, the reflective polarizer is a nanoscale line array film.

For example, it is assumed that in the light beams directed to the reflective polarizer 215 at the first time, the P-polarized beams account for one-half quantity of these light beams and S-polarized beams account for one-half quantity of these light beams. If the conversion of the S-polarized beams to the P-polarized beams by the quarter-wave plate 213 of the color light mixing device 21 is 50%, in the light beams directed to the reflective polarizer 215 at the second time, the P-polarized beams account for one-fourth quantity of these light beams and the S-polarized beams account for one-fourth quantity of these light beams. The S-polarized beams accounting for one-fourth quantity of these light beams will be reflected back to the sealed space of the tube structure. Similarly, in the light beams directed to the reflective polarizer 215 at the third time, the P-polarized beams account for one-eighth quantity of these light beams and the S-polarized beams account for one-eighth quantity of these light beams. The rest may be deduced by analogy. Finally, the total quantity of P-polarized beams permitted to be transmitted through the reflective polarizer 215 (i.e. $\frac{1}{2}+\frac{1}{4}+\frac{1}{8}+\frac{1}{16}+\ldots$) is substantially twice the light quantity of P-polarized beams transmitted through the reflective polarizer 215 at the first time. On the contrary, if no reflective polarizer 215 is included in the color light mixing device 21, about one-half quantity of the light beams will be lost.

From the above discussions, due to the reflective polarizer 215 of the color light mixing device 21, the light beams outputted from the light-emitting units 211 are mixed with each other for several times to produce mixed light beams with more homogeneous color and brightness level. Moreover, the use of the reflective polarizer 215 can increase the utilization efficiency of the light beams and allow single polarization-state beams to be outputted. Moreover, since the S-polarized beams are reusable by the color light mixing device 21, the overall length of the tube structure 212 will be effectively shortened without adversely affecting the quality of the light beams outputted from the color light mixing device 21. As known, since the length of the tube structure is shortened, the overall volume of the small-sized projecting system will be reduced.

Moreover, the arrangement of the light-emitting units 211 is one of the factors influencing the length of the tube structure 212. Generally, as the randomness of arranging the light-emitting units 211 is increased, the length of the tube structure 212 may be shortened to achieve the purpose of homogenizing and mixing the light beams. Hereinafter, some exemplary arrangements of the light-emitting units will be illustrated with reference to FIGS. 9A~9I. The arrangements of the light-emitting units are not restricted to these examples.

Figure 9A:
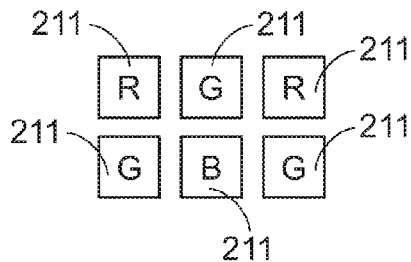
FIG. 9A is a schematic view illustrating a first exemplary arrangement of the light-emitting units.

FIG. 9A is a schematic view illustrating a first exemplary arrangement of the light-emitting units. As shown in FIG. 9A, these light-emitting units 211 include six LED chips in an arrangement of a 2×3 array. These six LED chips include two red LED chips respectively arranged at opposite sides of the 2×3 array for outputting red light beams, three green LED chips for outputting green light beams and one blue LED chip arranged at a middle region of the 2×3 array for outputting blue light beams, wherein any two adjacent ones of said LED chips output light beams of different colors. Moreover, the two red LED chips for outputting the red light beams may be connected with each other in series or in parallel, and the three green LED chips for outputting green light beams may be connected with each other in series or in parallel.

Figure 9B:
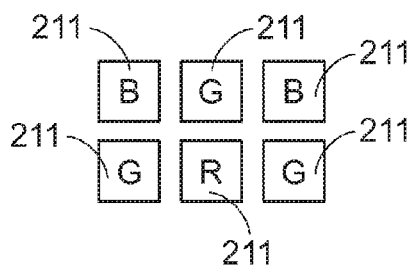
FIG. 9B is a schematic view illustrating a second exemplary arrangement of the light-emitting units.

FIG. 9B is a schematic view illustrating a second exemplary arrangement of the light-emitting units. As shown in FIG. 9B, these light-emitting units 211 also include six LED chips in an arrangement of a 2×3 array. These six LED chips include two blue LED chips respectively arranged at opposite sides of the 2×3 array for outputting blue light beams, three green LED chips for outputting green light beams and one red LED chip arranged at a middle region of the 2×3 array for outputting red light beams, wherein any two adjacent ones of said LED chips output light beams of different colors. Moreover, the two blue LED chips for outputting the blue light beams may be connected with each other in series or in parallel, and the three green LED chips for outputting green light beams may be connected with each other in series or in parallel.

Figure 9C:
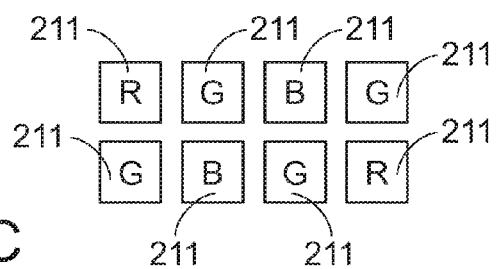
FIG. 9C is a schematic view illustrating a third exemplary arrangement of the light-emitting units.

FIG. 9C is a schematic view illustrating a third exemplary arrangement of the light-emitting units. As shown in FIG. 9C, these light-emitting units 211 include eight LED chips in an arrangement of a 2×4 array. These eight LED chips include two red LED chips respectively arranged at opposite sides of the 2×4 array for outputting red light beams, four green LED chips for outputting green light beams and two blue LED chips respectively arranged at middle two columns of the 2×4 array for outputting blue light beams, wherein any two adjacent ones of said LED chips output light beams of different colors.

Figure 9D:
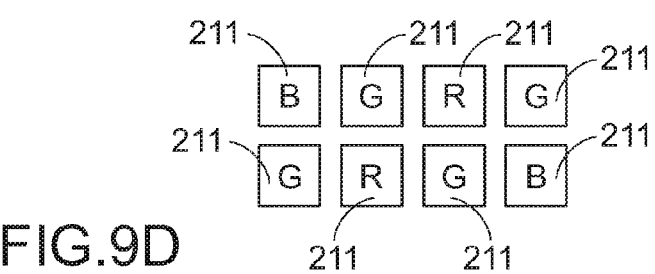
FIG. 9D is a schematic view illustrating a fourth exemplary arrangement of the light-emitting units.

FIG. 9D is a schematic view illustrating a fourth exemplary arrangement of the light-emitting units. As shown in FIG. 9D, these light-emitting units 211 also include eight LED chips in an arrangement of a 2×4 array. These eight LED chips include two blue LED chips respectively arranged at opposite sides of the 2×4 array for outputting blue light beams, four green LED chips for outputting green light beams and two red LED chips respectively arranged at middle two columns of the 2×4 array for outputting red light beams, wherein any two adjacent ones of said LED chips output light beams of different colors.

Figure 9E:
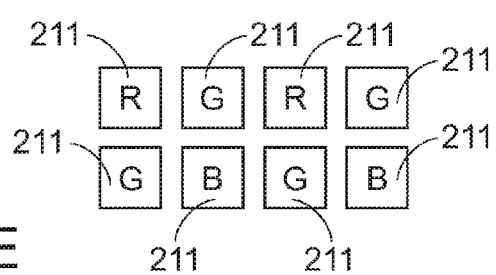
FIG. 9E is a schematic view illustrating a fifth exemplary arrangement of the light-emitting units.
Figure 9F:
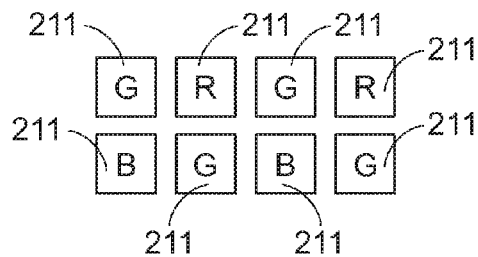
FIG. 9F is a schematic view illustrating a sixth exemplary arrangement of the light-emitting units.

FIG. 9E is a schematic view illustrating a fifth exemplary arrangement of the light-emitting units. FIG. 9F is a schematic view illustrating a sixth exemplary arrangement of the light-emitting units. As shown in FIG. 9E and FIG. 9F, these light-emitting units 211 also include eight LED chips in an arrangement of a 2×4 array. The 2×4 array comprises two identical 2×2 arrays. Each of the two 2×2 arrays comprises one red LED chip for outputting red light beams, one blue LED chip for outputting blue light beams and two green LED chips for outputting green light beams, wherein any two adjacent ones of said LED chips output light beams of different colors.

Figure 9G:
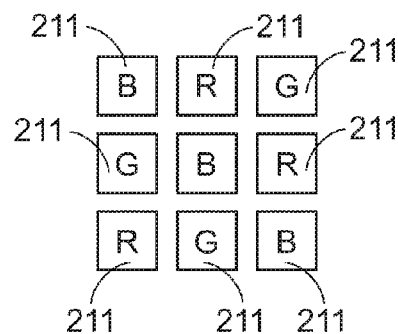
FIG. 9G is a schematic view illustrating a seventh exemplary arrangement of the light-emitting units.

FIG. 9G is a schematic view illustrating a seventh exemplary arrangement of the light-emitting units. As shown in FIG. 9G these light-emitting units 211 include nine LED chips in an arrangement of a 3×3 array. These nine LED chips include three blue LED chips for outputting blue light beams, three green LED chips for outputting green light beams and three red LED chips for outputting red light beams. The blue LED chips for outputting blue light beams are respectively arranged at the first row and the first column, the second row and the second column, and the third row and the third column of the 3×3 array. The green LED chips for outputting green light beams are respectively arranged at the first row and the third column, the second row and the first column, and the third row and the second column of the 3×3 array. The red LED chips for outputting red light beams are respectively arranged at the first row and the second column, the second row and the third column, and the third row and the first column of the 3×3 array.

Figure 9H:
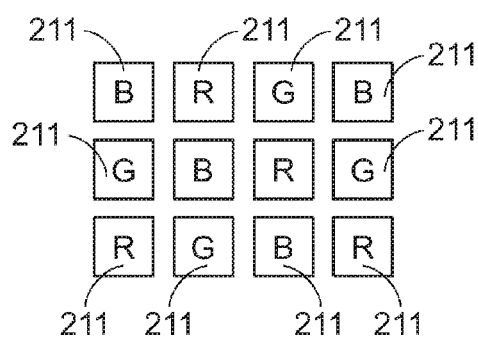
FIG. 9H is a schematic view illustrating an eight exemplary arrangement of the light-emitting units.

FIG. 9H is a schematic view illustrating an eight exemplary arrangement of the light-emitting units. As shown in FIG. 9H, these light-emitting units 211 include twelve LED chips in an arrangement of a 3×4 array. These twelve LED chips include four blue LED chips for outputting blue light beams, four green LED chips for outputting green light beams and four red LED chips for outputting red light beams. The blue LED chips for outputting blue light beams are respectively arranged at the first row and the first column, the first row and the fourth column, the second row and the second column, and the third row and the third column of the 3×4 array. The green LED chips for outputting green light beams are respectively arranged at the first row and the third column, the second row and the first column, the second row and the fourth column, and the third row and the second column of the 3×4 array. The red LED chips for outputting red light beams are respectively arranged at the first row and the second column, the second row and the third column, the third row and the first column, and the third row and the fourth column of the 3×4 array.

Figure 9I:
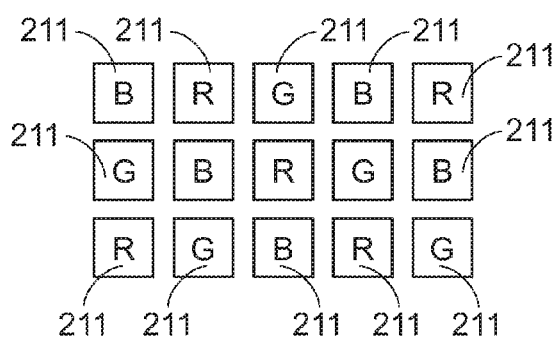
FIG. 9I is a schematic view illustrating a ninth exemplary arrangement of the light-emitting units.

FIG. 9I is a schematic view illustrating a ninth exemplary arrangement of the light-emitting units. As shown in FIG. 9I, these light-emitting units 211 include fifteen LED chips in an arrangement of a 3×5 array. These fifteen LED chips include five blue LED chips for outputting blue light beams, five green LED chips for outputting green light beams and five red LED chips for outputting red light beams. The blue LED chips for outputting blue light beams are respectively arranged at the first row and the first column, the first row and the fourth column, the second row and the second column, the second row and the fifth column, and the third row and the third column of the 3×5 array. The green LED chips for outputting green light beams are respectively arranged at the first row and the third column, the second row and the first column, the second row and the fourth column, the third row and the second column, and the third row and the fifth column of the 3×5 array. The red LED chips for outputting red light beams are respectively arranged at the first row and the second column, the first row and the fifth column, the second row and the third column, the third row and the first column, and the third row and the fourth column of the 3×5 array.

Figure 10:
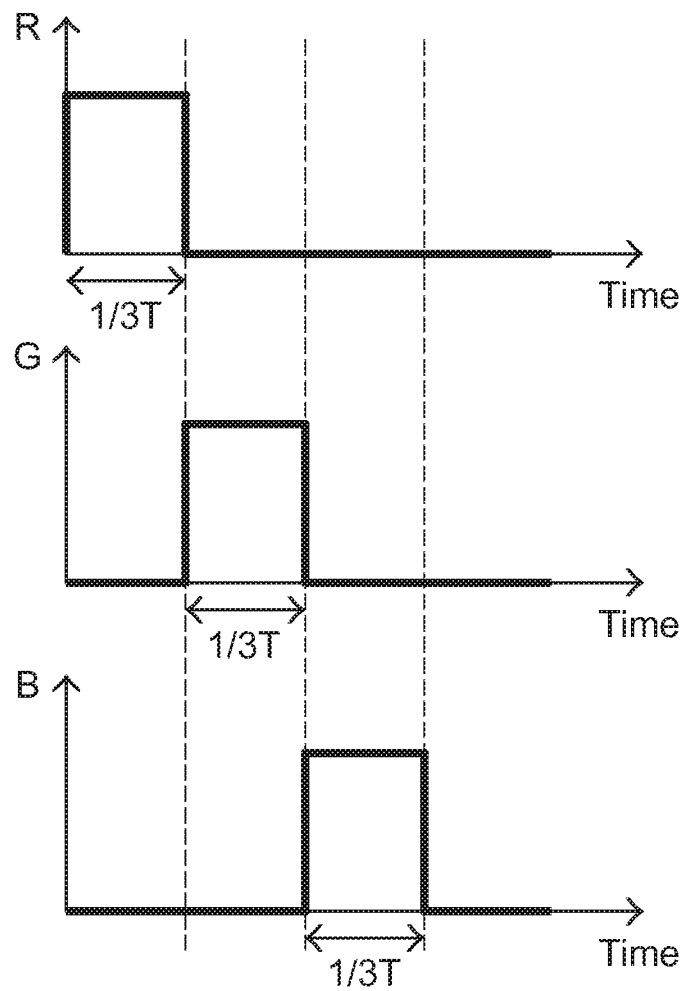
FIG. 10 is a schematic timing diagram illustrating a strategy of controlling the light-emitting units of the color light mixing device according to an embodiment of the present invention.

In the above embodiments, the light-emitting units 211 for outputting light beams of different colors are controlled by a controller to be sequentially turned on. Moreover, based on the persistence of vision, the light source with different colors can be produced. FIG. 10 is a schematic timing diagram illustrating a strategy of controlling the light-emitting units of the color light mixing device according to an embodiment of the present invention. As shown in FIG. 10, the red LED chip, the green LED chip and the blue LED chip are sequentially turned on to illuminate for one-third of an illuminating cycle T. Based on the persistence of vision, the resulting light source looks like a white light source.

Figure 11A:
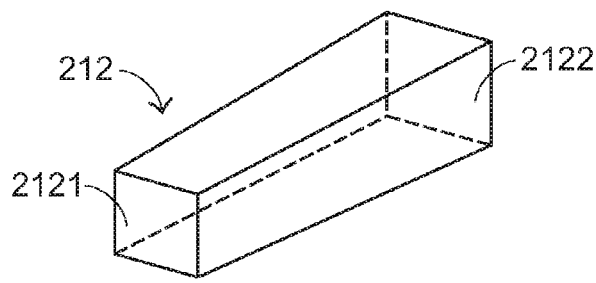
FIG. 11A is a schematic view illustrating an exemplary tube structure to be used with a rectangular microdisplay element.
Figure 11B:
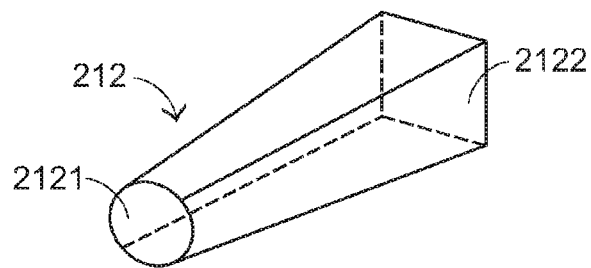
FIG. 11B is a schematic view illustrating another exemplary tube structure to be used with a rectangular microdisplay element.
Figure 11C:
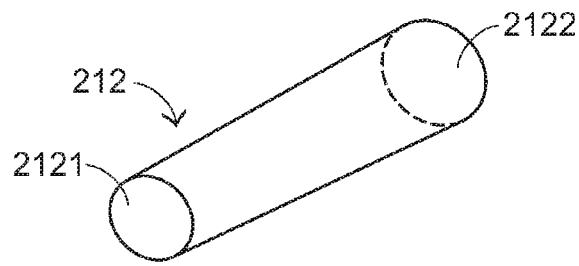
FIG. 11C is a schematic view illustrating an exemplary tube structure to be used with a circular microdisplay element.
Figure 11D:
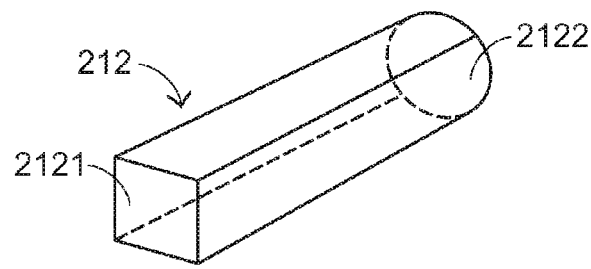
FIG. 11D is a schematic view illustrating another exemplary tube structure to be used with a circular microdisplay element.

For increasing the light utilization efficiency of the color light mixing device 21, it is preferred that the light shape of the light beams outputted from the color light mixing device 21 is close to the shape of the microdisplay element. Moreover, the tube structure 212 is preferably designed such that the area of the inlet end 2121 is smaller than or equal to the area of the outlet end 2122. For meeting the above requirements, four exemplary tube structures 212 will be illustrated with reference to FIGS. 11A~11D. FIG. 11A is a schematic view illustrating an exemplary tube structure to be used with a rectangular microdisplay element. As shown in FIG. 11A, the inlet end 2121 and the outlet end 2122 of the tube structure 212 are rectangle-shaped. FIG. 11B is a schematic view illustrating another exemplary tube structure to be used with a rectangular microdisplay element. As shown in FIG. 11B, the inlet end 2121 is circle-shaped, but the outlet end 2122 of the tube structure 212 is rectangle-shaped. FIG. 11C is a schematic view illustrating an exemplary tube structure to be used with a circular microdisplay element. As shown in FIG. 11C, the inlet end 2121 and the outlet end 2122 of the tube structure 212 are circle-shaped. FIG. 11D is a schematic view illustrating another exemplary tube structure to be used with a circular microdisplay element. As shown in FIG. 11B, the inlet end 2121 is rectangle-shaped, but the outlet end 2122 of the tube structure 212 is circle-shaped.

From the above description, according to the novel concepts and configurations of the present invention, the microdisplay element of the small-sized projecting system can be irradiated by the light beams with homogenized brightness level and color in the condition that the light-mixing path of the color light mixing device. As a consequence, the miniaturization and portability efficacy of the projecting system will be largely enhanced to meet the industrial requirements.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color light mixing device for providing a light source to illuminate a microdisplay element, said color light mixing device comprising:
   a tube structure;
   a plurality of light-emitting units for outputting light beams, wherein said light beams outputted from said light-emitting units are reflected or scattered within said tube structure for several times, so that said light beams are mixed with each other;
   a reflective polarizer located at an outlet end of said tube structure and receiving said mixed light beams including both P-polarized beams and S-polarized beams, wherein said P-polarized beams of said mixed light beams are permitted to be transmitted through said reflective polarizer, and said S-polarized beams of said mixed light beams are reflected back to said tube structure by said reflective polarizer and reflected or scattered within said tube structure for several times again; and
   a microlens assembly arranged between said tube structure and said reflective polarizer for changing directions of said mixed light beams from said tube structure to said reflective polarizer, thereby increasing randomness of said S-polarized beams of said mixed light beams reflected back to said tube structure by said reflective polarizer through said microlens.

2. The color light mixing device according to claim 1 wherein said reflective polarizer is disposed immediately adjacent to said microlens assembly to reflect said S-polarized beams of said mixed light beams back to said tube structure.

3. The color light mixing device according to claim 1 wherein said light-emitting units are located at an inlet end of said tube structure, and said tube structure is a sealed structure.

4. The color light mixing device according to claim 1 further comprising a quarter-wave plate, which is arranged between said tube structure and said microlens assembly, wherein portions of said S-polarized beams reflected by said reflective polarizer are converted into P-polarized beams by said quarter-wave plate.

5. The color light mixing device according to claim 1 wherein an inner wall of said tube structure is made of high reflectivity material, wherein said high reflectivity material is micro cellular polyethylene terephthalate (MCPET), film coating mirror material or high light-scattering white material, wherein said reflective polarizer is a nano scale line array film.

6. The color light mixing device according to claim 1 wherein said microlens assembly comprises a plurality of microlenses, which are arranged in an array, wherein each of said microlenses is a plano-convex lens, a biconvex lens, a concave-convex lens, a plano-concave lens, a biconcave lens or a convex-concave lens.

7. The color light mixing device according to claim 1 wherein said light beams outputted from at least two of said light-emitting units have different colors, or said light beams outputted from at least two of said light-emitting units have the same colors but different brightness levels.

8. The color light mixing device according to claim 1 wherein said light-emitting units are LED chips, and said light-emitting units include six LED chips in an arrangement of a 2×3 array,
   wherein said six LED chips include two red LED chips respectively arranged at opposite sides of said 2×3 array for outputting red light beams, three green LED chips for outputting green light beams and one blue LED chip arranged at a middle region of said 2×3 array for outputting blue light beams, and any two adjacent ones of said LED chips output light beams of different colors; or
   wherein said six LED chips include two blue LED chips respectively arranged at opposite sides of said 2×3 array for outputting blue light beams, three green LED chips for outputting green light beams and one red LED chip arranged at a middle region of said 2×3 array for outputting red light beams, and any two adjacent ones of said LED chips output light beams of different colors.

9. The color light mixing device according to claim 1 wherein said light-emitting units are LED chips, and said light-emitting units include six LED chips in an arrangement of a 2×4 array, wherein said eight LED chips include two red LED chips respectively arranged at opposite sides of said 2×4 array for outputting red light beams, four green LED chips for outputting green light beams and two blue LED chips respectively arranged at middle two columns of said 2×4 array for outputting blue light beams, and any two adjacent ones of said LED chips output light beams of different colors; or wherein said eight LED chips include two blue LED chips respectively arranged at opposite sides of said 2×4 array for outputting blue light beams, four green LED chips for outputting green light beams and two red LED chips respectively arranged at middle two columns of said 2×4 array for outputting red light beams, and any two adjacent ones of said LED chips output light beams of different colors.

10. The color light mixing device according to claim 1 wherein said light-emitting units are LED chips, and said light-emitting units include eight LED chips in an arrangement of a 2×4 array, wherein said 2×4 array includes two identical 2×2 arrays, wherein each of said two 2×2 arrays includes one red LED chip for outputting red light beams, one blue LED chip for outputting blue light beams and two green LED chips for outputting green light beams, and any two adjacent ones of said LED chips output light beams of different colors.

11. The color light mixing device according to claim 1 wherein said light-emitting units are LED chips, and said light-emitting units include nine LED chips in an arrangement of a 3×3 array, wherein said nine LED chips include three blue LED chips for outputting blue light beams, three green LED chips for outputting green light beams and three red LED chips for outputting red light beams, wherein said blue LED chips for outputting blue light beams are respectively arranged at the first row and the first column, the second row and the second column, and the third row and the third column of said 3×3 array, said green LED chips for outputting green light beams are respectively arranged at the first row and the third column, the second row and the first column, and the third row and the second column of said 3×3 array, and said red LED chips for outputting red light beams are respectively arranged at the first row and the second column, the second row and the third column, and the third row and the first column of said 3×3 array.

12. The color light mixing device according to claim 1 wherein said light-emitting units are LED chips, and said light-emitting units include twelve LED chips in an arrangement of a 3×4 array, wherein said twelve LED chips include four blue LED chips for outputting blue light beams, four green LED chips for outputting green light beams and four red LED chips for outputting red light beams, wherein said blue LED chips for outputting blue light beams are respectively arranged at the first row and the first column, the first row and the fourth column, the second row and the second column, and the third row and the third column of said 3×4 array, said green LED chips for outputting green light beams are respectively arranged at the first row and the third column, the second row and the first column, the second row and the fourth column, and the third row and the second column of said 3×4 array, and said red LED chips for outputting red light beams are respectively arranged at the first row and the second column, the second row and the third column, the third row and the first column, and the third row and the fourth column of said 3×4 array.

13. The color light mixing device according to claim 1 wherein said light-emitting units are LED chips, and said light-emitting units include fifteen LED chips in an arrangement of a 3×5 array, wherein said fifteen LED chips include five blue LED chips for outputting blue light beams, five green LED chips for outputting green light beams and five red LED chips for outputting red light beams, wherein said blue LED chips for outputting blue light beams are respectively arranged at the first row and the first column, the first row and the fourth column, the second row and the second column, the second row and the fifth column, and the third row and the third column of said 3x5 array, said green LED chips for outputting green light beams are respectively arranged at the first row and the third column, the second row and the first column, the second row and the fourth column, the third row and the second column, and the third row and the fifth column of said 3×5 array, and said red LED chips for outputting red light beams are respectively arranged at the first row and the second column, the first row and the fifth column, the second row and the third column, the third row and the first column, and the third row and the fourth column of said 3×5 array.

14. The color light mixing device according to claim 1 wherein said light beams are outputted from said light-emitting units according to different time sequences.

15. The color light mixing device according to claim 1 wherein said microdisplay element is a LCOS (liquid crystal on silicon) panel, a digital micromirror device (DMD) or a transmissive LCD panel.

16. The color light mixing device according to claim 3 wherein the area of said inlet end of said tube structure is smaller than or equal to the area of said outlet end, wherein said inlet end and said outlet end of said tube structure are both rectangle-shaped, or said inlet end and said outlet end of said tube structure are both circle-shaped, or one of said inlet end and said outlet end of said tube structure is rectangle-shaped and the other is circle-shaped.

17. The color light mixing device according to claim 6 wherein said microlenses includes a one-dimensional array of at least two vertically-arranged cylindrical lenses and a one-dimensional array of at least two horizontally-arranged cylindrical lenses.

18. The color light mixing device according to claim 6 wherein if said light-emitting units are arranged in a one-dimensional array, a direction of arranging said microlenses is the same as a direction of arranging said light-emitting units, and said microlenses are cylindrical, wherein if said light-emitting units are irregularly arranged, said microlenses are arranged in a two-dimensional array, and said microlenses are rectangle-shaped or ball-shaped.

19. The color light mixing device according to claim 8 wherein said red LED chips for outputting said red light beams are connected with each other in series or in parallel, and said green LED chips for outputting green light beams are connected with each other in series or in parallel.

20. A small-sized projecting system, comprising:
a microdisplay element for showing an image;
a color light mixing device for providing a light source to said microdisplay element, wherein said color light mixing device comprises:
a tube structure;
a plurality of light-emitting units for outputting light beams, wherein said light beams outputted from light-emitting units are reflected or scattered within said tube structure for several times, so that said light beams are mixed with each other;

a reflective polarizer arranged at an outlet end of said tube structure and receiving said mixed light beams including both P-polarized beams and S-polarized beams, wherein said P-polarized beams of said mixed light beams are permitted to be transmitted through said reflective polarizer, and said S-polarized beams of said mixed light beams are reflected back to said tube structure by said reflective polarizer and reflected or scattered within said tube structure for several times again; and a microlens assembly arranged between said tube structure and said reflective polarizer and immediately adjacent to said reflective polarizer for changing directions of said mixed light beams from said tube structure to said reflective polarizer, thereby increasing randomness of said S-polarized beams of said mixed light beams reflected back to said tube structure by said reflective polarizer through said microlens; and an optical projection lens assembly arranged between a screen and said microdisplay element for projecting said image onto said screen, so that said image is enlarged and shown on said screen.

21. The small-sized projecting system according to claim 20 wherein said microdisplay element is a LCOS (liquid crystal on silicon) panel.

22. The small-sized projecting system according to claim 20 wherein if said small-sized projecting system further comprises a polarization beam splitter (PBS) between said microdisplay element, said color light mixing device and said optical projection lens assembly, said microdisplay element is a LCOS (liquid crystal on silicon) panel, or wherein if said small-sized projecting system further comprises a total internal reflection (TIR) prism between said microdisplay element, said color light mixing device and said optical projection lens assembly, said microdisplay element is a digital micromirror device (DMD).

23. The small-sized projecting system according to claim 20 wherein said light-emitting units are located at an inlet end of said tube structure, and said tube structure is a sealed structure.

24. The small-sized projecting system according to claim 20 wherein said color light mixing device further comprises a quarter-wave plate between said tube structure and said microlens assembly for converting portions of said S-polarized beams reflected by said reflective polarizer into P-polarized beams, and/or an inner wall of said tube structure is made of high reflectivity material.

25. The small-sized projecting system according to claim 20 wherein said microlens assembly comprises a plurality of microlenses, which are arranged in an array, wherein each of said microlenses is a plano-convex lens, a biconvex lens, a concave-convex lens, a plano-concave lens, a biconcave lens or a convex-concave lens.

26. The small-sized projecting system according to claim 20 wherein said light beams outputted from at least two of said light-emitting units have different colors, or said light beams outputted from at least two of said light-emitting units have the same colors but different brightness levels, or said light beams are outputted from said light-emitting units according to different time sequences.

27. The small-sized projecting system according to claim 25 wherein if said light-emitting units are arranged in a one-dimensional array, a direction of arranging said microlenses is the same as a direction of arranging said light-emitting units, and said microlenses are cylindrical, wherein if said light-emitting units are irregularly arranged, said microlenses are arranged in a two-dimensional array, and said microlenses are rectangle-shaped or ball-shaped.

* * * * *